United States Patent
Kmiecik et al.

(10) Patent No.: US 6,325,962 B1
(45) Date of Patent: *Dec. 4, 2001

(54) METHOD OF MANUFACTURING A BLOW MOLDED HINGE ASSEMBLY

(75) Inventors: Daniel J. Kmiecik, Dearborn Heights; Dave Pariseau, Grass Lake; Lisa Kay Dusseau, Ann Arbor, all of MI (US)

(73) Assignee: Visteon Global Technologies, Inc., Dearborn, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/222,127

(22) Filed: Dec. 29, 1998

(51) Int. Cl.[7] .............................. B29C 49/00; B29C 49/30
(52) U.S. Cl. .......................... 264/523; 264/515; 264/531; 264/534; 264/540
(58) Field of Search ...................... 16/260, 266, DIG. 13; 264/523, 531, 534, 540, 515

(56) References Cited

U.S. PATENT DOCUMENTS

| | | | |
|---|---|---|---|
| Re. 31,086 | | 11/1982 | Johnson, Jr. et al. ................ 220/337 |
| 2,346,977 | * | 4/1944 | La Sha .................................... 16/266 |
| 3,902,628 | * | 9/1975 | Schurman ............................ 220/306 |
| 4,029,234 | * | 6/1977 | Johnson, Jr. et al. ................ 220/337 |
| 4,515,424 | * | 5/1985 | Sakurai .................................... 16/266 |
| 4,623,071 | * | 11/1986 | Malcolm ............................... 220/337 |
| 4,840,514 | * | 6/1989 | Defrance et al. ....................... 16/260 |
| 5,057,267 | * | 10/1991 | Seizert et al. .......................... 264/541 |
| 5,125,511 | | 6/1992 | Chamberlin et al. ........... 16/DIG. 13 |
| 5,288,453 | | 2/1994 | Rutenbeck et al. ............. 16/DIG. 13 |
| 5,656,234 | * | 8/1997 | Kaneishi et al. ....................... 264/572 |
| 5,745,953 | * | 5/1998 | Golden .................................... 16/260 |

FOREIGN PATENT DOCUMENTS

| | | | | |
|---|---|---|---|---|
| 2558512 | * | 7/1985 | (FR) ..................................... | 16/260 |
| 10045126A | * | 2/1998 | (JP) . | |

* cited by examiner

Primary Examiner—Suzanne E. McDowell
(74) Attorney, Agent, or Firm—Larry Shelton

(57) ABSTRACT

A method of manufacturing a blow-molded hinge assembly includes blow-molding a first member having a first body. The first body is made from two layers of plastic parison that are molded to form a generally solid plastic T-shaped tongue portion having barrel protrusions. A second member having a second body is also blow-molded. The second body has a recessed portion integrally formed therein. The recessed portion has opposed keyways receiving the barrel protrusions. The recessed portion has slots receiving the T-shaped tongue portion. The second member is formed by blow-molding the recessed portion around a T-shaped slide. The slide has a rounded portion that forms the keyways and a flat portion that forms the slots. After blow-molding the second member, the slide is removed from the recessed portion.

4 Claims, 3 Drawing Sheets

METHOD OF MANUFACTURING A BLOW MOLDED HINGE ASSEMBLY

BACKGROUND OF THE INVENTION

1. Field of the Invention

The present invention is directed to a blow-molded plastic hinge. More specifically, the present invention is directed to an easily manufactured blow-molded hinge made with a tongue and recessed portion that may be assembled in a first position and that are retained but allowed to pivot when rotated to any other position.

2. Description of the Related Arts

It is useful to produce plastic parts with integral hinges. Various hinge constructions may be formed into the part to provide the rotation between the components. One construction utilizes a "living hinge" which includes a portion of plastic material connecting the various components. Living hinges experience fatigue when used repeatedly or when used over a wide pivot range.

Another hinge construction includes pins and sockets formed directly within the parts to be joined. This construction can be used with both blow-molding and injection molding. U.S. Pat. No. RE 31,086 teaches a method of forming a blow-molded container having an integrally formed pin and socket (journal). The socket is formed from a flexible wall portion that extends beyond the main body of the lid. The socket flexes over the pins when the lid and base are brought together. The sockets are generally centered at the midpoint of the pins.

While this construction enables the fabrication of an assembly having an integrally blow-molded hinge, the assembly has several disadvantages overcome by the present invention. The assembly in the U.S. Pat. No. RE 31,086 patent requires that the flexible extending sockets flex over the pins. This requires that at least a portion of the assembly be made of relatively thin flexible plastic material. The assembly process also includes the difficulty of forcibly assembling the two components by flexing the socket over the pins. Additionally, the hinge is not self-centering. The socket is made to have a spacing that lies at the mid point of the pins when the base and lid are assembled. This allows the lid to slide transversely along the pins. This transverse movement may result in a misalignment that impairs the ability to open or close the members. The movement also presents an unwanted "play" between the members.

Plastic articles having integrally molded hinges are increasingly used in automotive applications. Cargo carriers, glove box doors, console covers, ash trays, cup holders and access panels are examples of parts that may utilize an integrally formed hinge. It is desirable to fabricate the members to having the hinge components integrally formed thereon in the molding operation. This patent is directed to components that have their hinge components integrally formed in the blow-molding operation. The components are made without additional fasteners, pins or sockets. The parts are made from a rigid plastic material that need not flex to be assembled. This enables the repeatability needed for high speed manufacturing operations and also reduces the possibility of inadvertently damaging the hinge by over flexing one of the components.

The present invention also overcomes the unwanted play in the hinge by providing a self centering feature that aligns the components when assembled. These disadvantages of the prior art are overcome by the hinge construction described and claimed herein.

SUMMARY OF THE INVENTION

The present invention is directed to a blow-molded hinge assembly. The hinge assembly is made from a first and a second member. The first member has a first body and a T-shaped tongue portion. The first body and tongue portion are integrally from a single plastic wall. The tongue portion has a shank portion and two opposed barrel protrusions that form the hinge pins.

The second member has a second body and a recessed portion formed therein. The recessed portion has two opposed keyways and two opposed slots. The keyways accept the tongue when the first member is inserted into the second member when the first member is in a first position. The protrusions are rotatably engaged within the keyways. The slots and keyways retain the first member about a pivoting axis when the first member is rotated from the first position.

The first and second member are joined to provide a self centering hinge assembly that has little or no play. The first and second members may be easily disassembled by moving the first member to the first position and withdrawing the first member from the second member.

The assembly may be made from relatively thick plastic materials because the components need not flex or bend to be assembled. The keyways provide an insertion path for the tongue assembly. A stop surface may be added to either the first or second member to prevent the second member from being moved "over center".

These and other objects, features, and advantages of the present invention will become more readily apparent when viewed in connection with the accompanying drawings wherein like reference numerals correspond to like components.

DETAILED DESCRIPTION OF THE PREFERRED EMBODIMENTS

The present invention will be described through a series of drawings, which illustrate the blow-molded hinge claimed. The drawings describe a first and second member. These members may be a container and lid, access and door, or recess and cover. A wide variety of components may be made using the methods and construction described and are included within the invention described herein.

Figure 1:
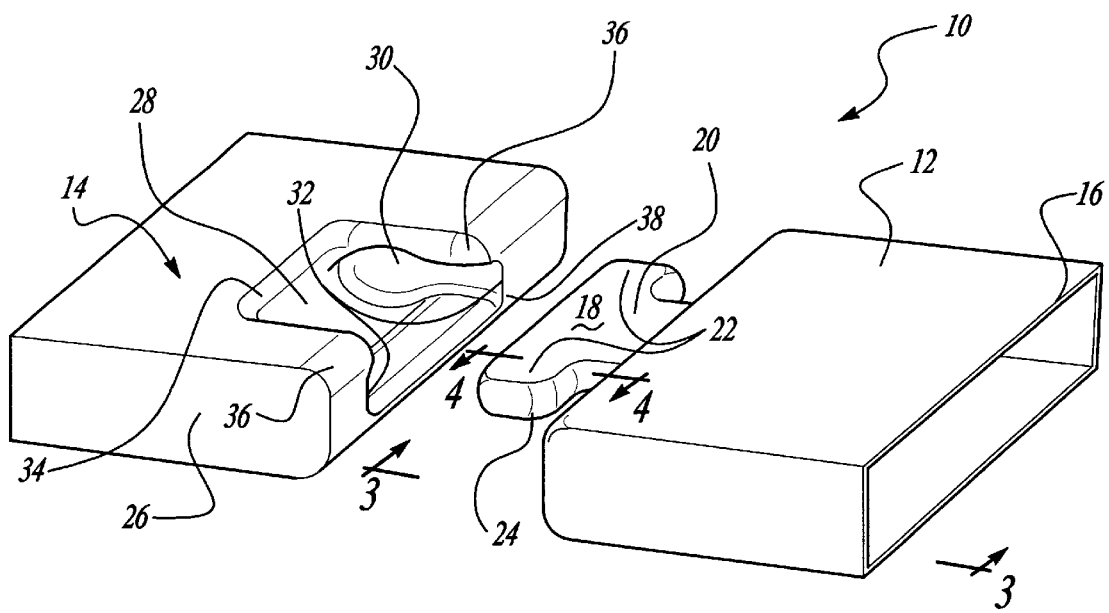
FIG. 1 is a perspective view of the first and second members being assembled.

The following items are a word list of the items described in the drawings and are reproduced to aid in understanding the invention:
10 hinge assembly
12 first member
14 second member
16 first body
18 T-shaped tongue portion
20 shank
22 barrel protrusions 24 corners
26 second body
28 recessed portion
30 keyways
32 slots
34 stop surface
36 shoulder portions
38 slot walls
40 mold
42 dies
44 slide
46 parison
48 rounded portion
50 flat portion
52 parison
54 flat surfaces
58 rounded surfaces
60 first position
62 second position Illustrated in FIG. 1 is a perspective view of a blow-molded hinge assembly 10. The hinge assembly 10 includes a first member 12 and a second member 14. The first member 12 includes a first body 16. The first body 16 forms the bulk of the first member 12. For example, if the blow-molded article is a container, the first member 12 may be the lid and the first body 16 would comprise the bulk of the lid. Formed integrally with the first body 16, is a T-shaped tongue portion 18. The tongue portion 18 is generally formed from two layers of the parison that becomes trapped between the mold walls. The tongue portion 18 is generally solid plastic and provides a strong connection between the first and second members 12, 14. The tongue portion 18 includes a shank portion 20 and two opposed barrel protrusions 22. The shank portion 20 is narrower than the barrel protrusions 22 to provide clearance for the first member 12 to pivot in the second member 14. The protrusions 22 are integrally formed with the tongue portion 18 and act to center the first member 12 within the second member 14 and to provide a pivoting axis for the hinge assembly 10. The protrusions 22 have curved or rounded corners 24. The corners 24 enable the protrusions 22 to be easily inserted within the second member 14 and also reduce the amount of friction between the first and second members 12, 14 by reducing the surface contact therebetween.

The second member 14 includes a second body 26. The second body 26 forms the bulk of the second member 14. For example, if the blow-molded article is a container, the second body 26 would comprise the bulk of the container body. Located on one edge of the second body 26 is a recessed portion 28. The recessed portion 28 is integrally formed in the blow-molding process as will be more completely described below. The recessed portion 28 includes two opposed keyways 30. A pair of slots 32 provide access to the keyways 30. The keyways 30 are generally circular and allow the barrel protrusion 22 to freely rotate therein. The slots 32 provide a passageway to insert the tongue portion 18 into the recessed portion 28.

The recessed portion 28 also includes a stop surface 34. The stop surface 34 engages the tongue 18 to prevent the first member 12 from being moved to an "over center" position. The recessed portion 28 also includes shoulder portions 36 that surround the keyways 30. The distance between shoulder portions 36 forms the shoulder spacing. The shoulder spacing is sized to be slightly larger than the width of the shank 20 so that the shoulder portions 36 do not contact the shank 20.

The distance between the slots 32 is the slot spacing. The slot spacing is selected to be approximately the same as the width of the tongue portion 18 is measured through the protrusions 22. The tongue portion 18 fits securely between the slots 32. The slot walls 38 act to center the tongue portion 18 when it is inserted into the recessed portion 28. The slot walls 38 align the protrusion 22 and center the first member 12. There is no "play" in the first member 12 because it is retained by the slot walls 38.

Figure 2:
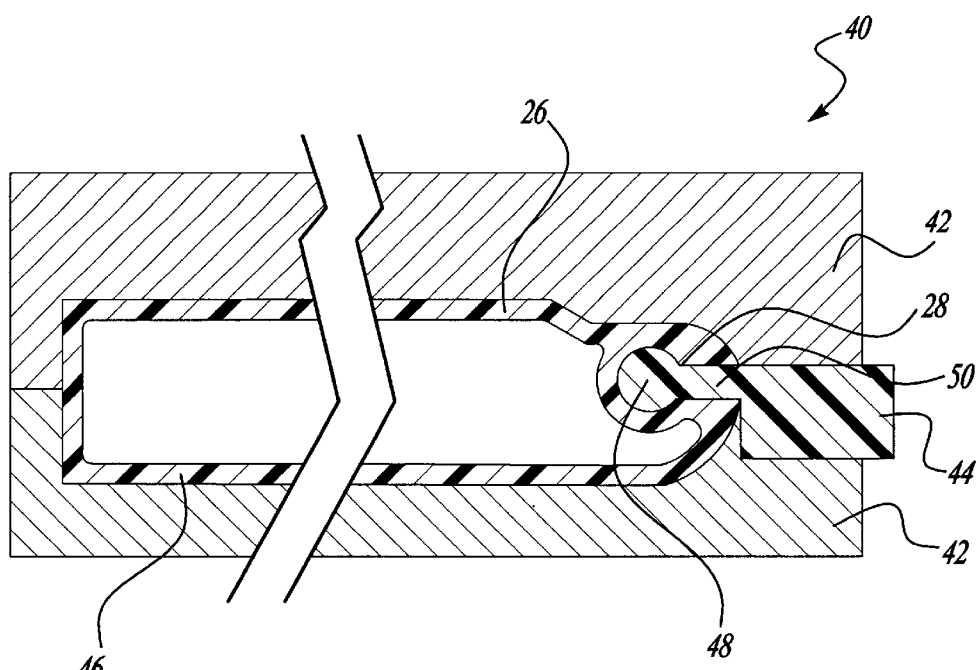
FIG. 2 is a cross-sectional view of a mold forming the second member.

The second member 14 is formed in a blow-mold 40 as shown in FIG. 2. The mold 40 include upper and lower dies 42 and a movable slide 44. A parison 46 is extruded between the dies 42 when the mold 40 is in an open position. The slide 44 is inserted into the mold 40. The mold 40 is closed and the parison 46 is inflated. The parison 46 conforms to the shape of dies 42 and slide 44. The parison 46 forms the second body 26 and the recessed portion 28. The slide 44 includes a rounded portion 48 that forms the keyways and a flat portion 50 that forms the slots. After the parison 46 has partially solidified, the mold 40 is opened and the slide 44 is withdrawn. The rounded portion 48 has a diameter slightly greater than the width of the flat portion 50. The slide is die locked by the parison 46. The rounded portion 48 causes the still pliable parison 46 to deform when the slide 44 is withdrawn. This deformation is performed while the parison is still semi-solid and the deformation does not fatigue the plastic material.

Figure 3:
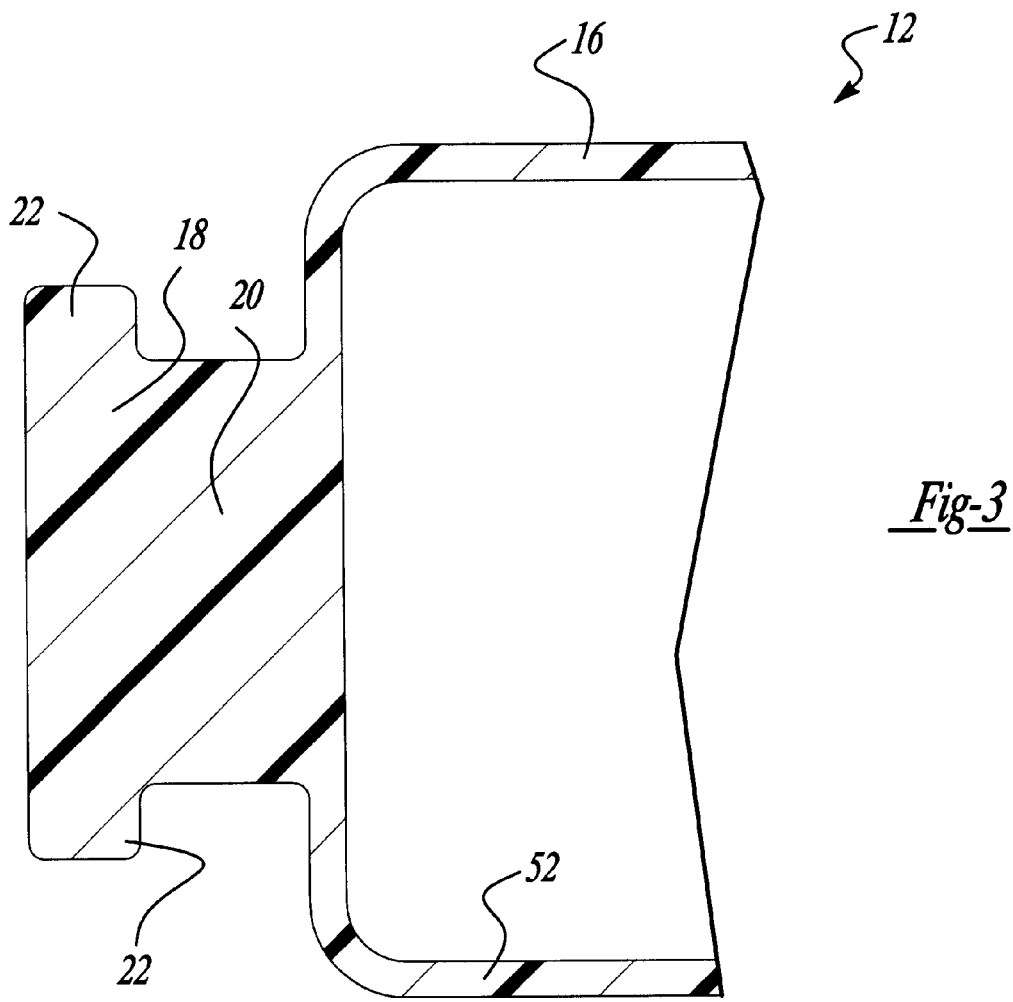
FIG. 3 is a cross-sectional view of the first member taken along the line 3—3 in FIG. 1.

The first member 12 is formed in the same method as the second member 14. Illustrated in FIG. 3 is a cross-sectional view of the second member taken along the lines 3—3 in FIG. 1. The second member 12 is formed from a plastic parison 52. The T-shaped tongue portion 18 is formed at one end of the parison 52 where the walls are pinched between the mold dies. The shank portion 20 and the protrusions 22 are integrally formed with the first body 16.

Figure 4:
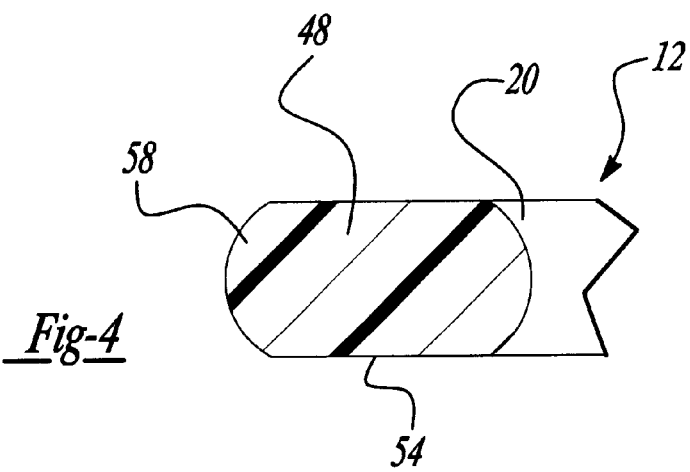
FIG. 4 is a partial cross-sectional view of the first member taken along the line 4—4 in FIG. 1.

Illustrated in FIG. 4 is a partial cross-sectional view of the first member 12 taken along the lines 4—4 in FIG. 1. The protrusions 48 include flat surfaces 54 than enables the protrusions 48 to fit within the slots 32. The protrusions 48 also include rounded surfaces 58 that fit within the keyways 30. The protrusions 22 and shank 20 are generally solid and provide a strong secure attachment between the members 12, 14. The first member 12 is generally formed in a conventional blow-molding mold (not shown) and is generally not subject to die-lock.

Figure 5:
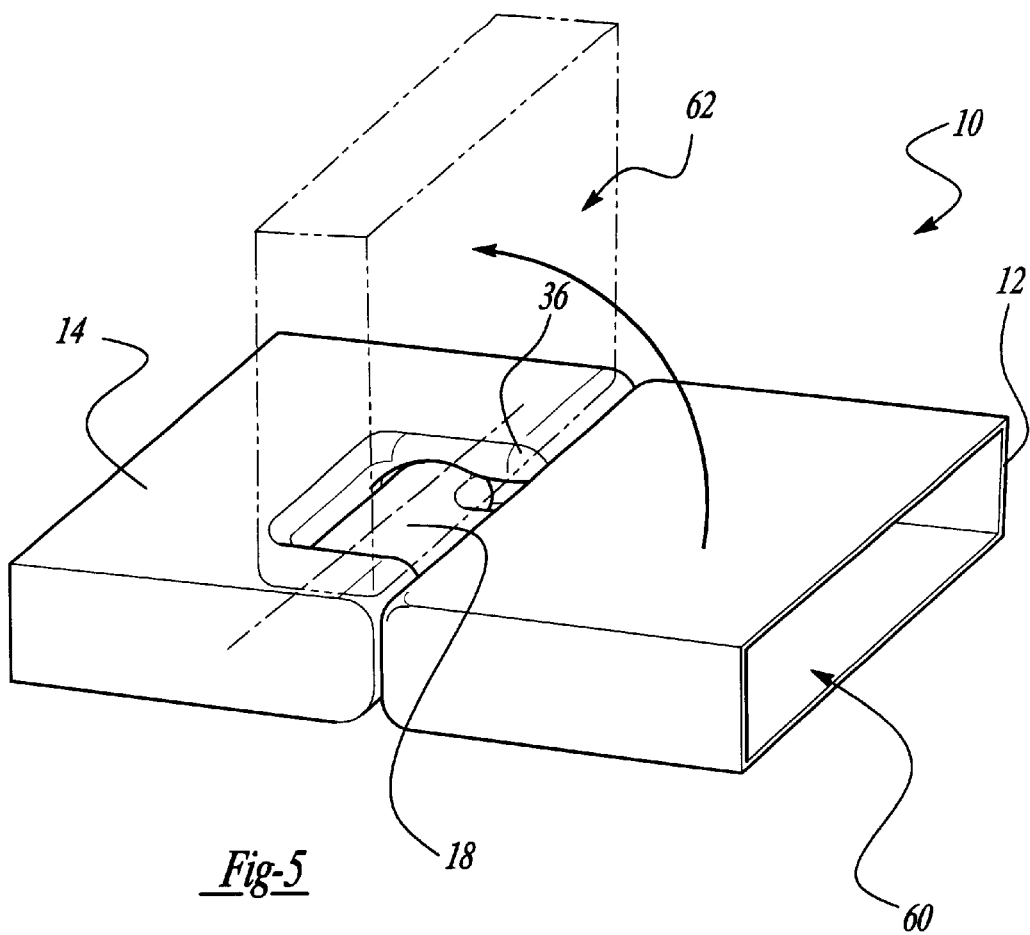
FIG. 5 is a perspective view of the hinge assembly.

The first and second members 12, 14 are assembled as shown in FIG. 5. The second member 14 is generally stationary and the first member 12 is aligned in a first position 60. The first position 60 aligns the flat surfaces 54 with the slots 32 and enables the tongue portion 18 to be inserted within the recessed portion 28. The protrusions 22 are seated within the keyways 30. The protrusions 22 rotate within the keyways 30 when the first member 12 is rotated to a second position 62. The shoulder potions 36 surround the protrusions 22 and retain the tongue 18 within the recessed portion when the first member is in any position except the first position 60.

This first position 60 is selected either for the manufacturing or assembly convenience or alternatively, the first position may be selected to be in a position that places a low strain on the hinge. The first position 60 may be either an opened, closed or a partially opened position. The assembly 10 may be assembled and disassembled without any tools and without deforming or forcing the members into position. The first member 12 is centered within the second member 14 and has little or no play when in any position.

While the invention has been described and illustrated as a first and second body having a single hinge, multiple hinges may be formed on the members and aligned along the pivot axis.

While the best modes for carrying out the invention have been described in detail, those familiar with the art to which this invention relates will recognize various alternative designs and embodiments for practicing the invention as defined by the following claims.

What is claimed:

1. A method of manufacturing a blow-molded hinge assembly comprising the steps of:

blow-molding a first member having a first body, said first body made from two layers of plastic parison that are molded to form a generally solid plastic T-shaped tongue portion having barrel protrusions;

blow-molding a second member having a second body, said second body having a recessed portion integrally formed therein, said recessed portion having opposed keyways receiving said barrel protrusions, said recessed portion having slots receiving said T-shaped tongue portion, said second member being formed by blow-molding said recessed portion around a T-shaped slide, said slide having a rounded portion that forms said keyways and a flat portion that forms said slots;

after blow-molding said second member, removing said slide from said recessed portion; and assembling said first member an d said second member to form said hinge assembly, by inserting said tongue portion of said first member through said slots into said recessed portion of said second member, so that said protrusions of said tongue portion are seated within said keyways of said recessed portion.

2. The method of claim 1, wherein said slide rounded portion has a diameter slightly greater than the width of the flat portion and said slide is die locked by said recessed portion.

3. The method of claim 2, wherein said slide removing step causes said rounded portion to deform said slots.

4. A method of manufacturing a blow-molded hinge assembly comprising the steps of:

blow-molding a first member having a first body, said first body made from two layers of plastic parison that are molded to form a generally solid plastic T-shaped tongue portion having barrel protrusions;

blow-molding a second member having a second body, said second body having a recessed portion integrally formed therein, said recessed portion having opposed keyways receiving said barrel protrusions, said recessed portion having slots receiving said T-shaped tongue portion, said second member being formed by blow-molding a plastic parison between first and second dies and a T-shaped slide which can be moved inward and outward between said dies, said recessed portion being blow-molded around said slide, said slide having a rounded portion that forms said keyways and a flat portion that forms said slots;

after blow-molding said second member, moving said slide outward relative to said dies so as to remove said slide from said recessed portion; and assembling said first member and said second member to form said hinge assembly, by inserting said tongue portion of said first member through said slots into said recessed portion of said second member, so that said protrusions of said tongue portion are seated within said keyways of said recessed portion.

* * * * *